US007891925B2

(12) United States Patent
Seigneur et al.

(10) Patent No.: US 7,891,925 B2
(45) **Date of Patent: *Feb. 22, 2011**

(54) SHEAR RESISTANT RIVET AND SAW CHAIN

(75) Inventors: Christopher D. Seigneur, West Linn, OR (US); David Scott Penrose, Eagle Creek, OR (US); Mike Goettel, Canby, OR (US)

(73) Assignee: Blount, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/487,589

(22) Filed: Jun. 18, 2009

(65) Prior Publication Data

US 2009/0255393 A1 Oct. 15, 2009

Related U.S. Application Data

(63) Continuation of application No. 11/295,827, filed on Dec. 6, 2005, now Pat. No. 7,563,064.

(51) Int. Cl.
*F16B 19/06* (2006.01)

(52) U.S. Cl. ....................................... 411/504; 411/501

(58) Field of Classification Search ................. 411/501, 411/502, 504, 506, 424
See application file for complete search history.

(56) References Cited

U.S. PATENT DOCUMENTS

| | | | | | |
|---|---|---|---|---|---|
| 0,565,049 | A | | 8/1896 | Test | |
| 2,393,564 | A | | 1/1946 | Poupitch | |
| 3,090,712 | A | * | 5/1963 | Berry | 148/644 |
| 3,209,446 | A | | 10/1965 | Nicholas | |
| 3,301,120 | A | * | 1/1967 | Loyd | 411/411 |
| 3,626,531 | A | | 12/1971 | Mazer | |
| 3,762,266 | A | | 10/1973 | Thellmann | |
| 3,848,389 | A | | 11/1974 | Gapp | |
| 3,911,783 | A | | 10/1975 | Gapp | |
| 4,702,880 | A | * | 10/1987 | Porowski et al. | 376/305 |
| 4,730,970 | A | * | 3/1988 | Hyner et al. | 411/387.4 |
| 5,076,149 | A | | 12/1991 | Everts | |
| 5,153,996 | A | | 10/1992 | Kuzarov | |
| 5,729,882 | A | | 3/1998 | Travis | |
| 5,755,542 | A | * | 5/1998 | Janusz et al. | 411/387.4 |
| 6,138,658 | A | | 10/2000 | Bell | |
| 6,438,836 | B1 | | 8/2002 | Barth | |
| 7,563,064 | B2 | * | 7/2009 | Seigneur et al. | 411/504 |
| 2004/0000280 | A1 | | 1/2004 | Griffin | |

* cited by examiner

*Primary Examiner*—Flemming Saether
(74) *Attorney, Agent, or Firm*—Schwabe Williamson & Wyatt

(57) ABSTRACT

A saw chain rivet is provided including a flange, and a hub extending from a side of the flange. A shoulder defined by a junction between the hub and the flange has properties optimized to resist shear forces. The hub may be optimized for ease of rivet head formation.

4 Claims, 5 Drawing Sheets

14
18
10

18
24
12
16

10
18
35
12
2
2
12
16
20
18
35

32
24
30
30
26
28
28
22
30
12
28
24
32

SHEAR RESISTANT RIVET AND SAW CHAIN

RELATED APPLICATIONS

The present application is a continuation of U.S. patent application Ser. No. 11/295,827, filed on Dec. 6, 2005, entitled SHEAR RESISTANT RIVET AND SAW CHAIN.

FIELD

Embodiments of the invention relate generally to the field of saw chain rivets, and more particularly to rivets having shear resistant regions to reduce rivet shear when large forces are encountered, while maintaining other regions optimized for rivet head formation.

BACKGROUND

A common mode of failure for saw chains used on mechanical harvesters is rivet shear. The reason for such increased rivet shear is that tree harvester saw chain has been simply a larger version of saw chain suited for conventional chain saws. Tree harvesters, however, apply a significantly greater force in the saw chain, which in turn can cause a saw chain to bind in the bar groove, not release when engaging an un-cuttable object, and the like. Since conventional chain saw chain is not suited to withstand such forces, the tree harvester saw chains are prone to breaking, and in particular to shearing at the shoulder of the rivets coupling the chain components together.

Once broken, the end of the chain can be rapidly accelerated in a whip-like motion wherein other parts of the chain may break free, and fly through the air with as much kinetic energy as a rifle bullet. This phenomenon is referred to as chain shot. Of course, chain shot is dangerous to persons, and equipment, nearby. Steps to reduce risk to operators and equipment include, chain catchers, chain shot guards, and replacing the standard 13-mm cab glass with 19-mm or thicker laminated polycarbonate windows. Other steps to mitigate risk include inspecting chains for damage before use. However, it is believed that many chains fail the instant they are damaged.

Saw chains for concrete cutters, for example, may also tend to break through the rivets and rivet holes as the chain material contacting the bar is worn away. To provide longer life to the chain more material can be added between the bar contact area and rivet hole by reducing the rivet hole diameter in the cutters and tie straps. This added material can increase the strength and life of the cutters or tie straps but decreases the shearing strength of the rivets because the rivet diameter is reduced. Striking a balance between rivet diameter and material thickness in the other chain components may be difficult.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Figure 2B:
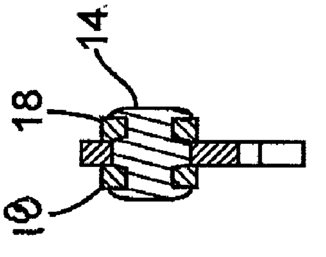
FIGS. 2*a* and 2*b* illustrate cross-sectional views of a saw chain, taken along the line 2-2, in FIG. 1 in accordance with an embodiment of the present invention.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" may be used repeatedly. The phrase generally does not refer to the same embodiment;

however, it may. The terms "comprising," "having," and "including" are synonymous, unless the context dictates otherwise.

The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)." The phrase "(A) B" means "(B) or (A B)"; that is, A is optional.

Embodiments of the present invention may include a rivet adapted to couple tie strap pairs or a cutter and tie strap with a drive link that may include one or more regions of relatively high shear resistance. In one embodiment, one or more regions in and around the shoulder area may be hardened to a higher hardness than the end portions of the rivet hub, which generally need to be ductile enough to be deformed into a rivet head. Various embodiments may further include increasing the hardness of a portion of the surface of the flange to hardness greater than that of the shoulder in order to provide a more wear resistant surface. Finally, various embodiments may include hub ends being sufficiently hard, to aid in deforming the deformable regions.

A number of hardness scales are known. Here, the so-called "C-scale" of the Rockwell hardness scale (HRC) will be used when referring to hardness levels, when describing embodiments of the invention.

Embodiments according to the invention provide a rivet having shear resistant properties that may provide a saw chain, such as a harvester chain with increased strength to withstand significant forces that may be exerted on it while in use. Greater flexibility in saw chain design may be possible due to stronger and more reliable rivets provided by various embodiments according to the invention. Various embodiments may allow for increased material thickness in, for example, the rivet areas of chain components by allowing for a reduced rivet diameter. Such increased material thickness may maximize overall strength and life of, for example, a concrete cutting saw chain, or other saw chain adapted for use with mechanical or human controlled cutting devices.

Figure 2A:
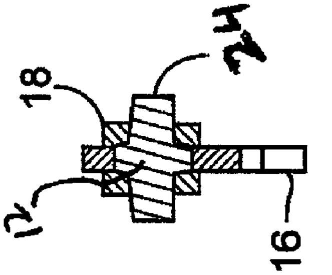
Figure 1:
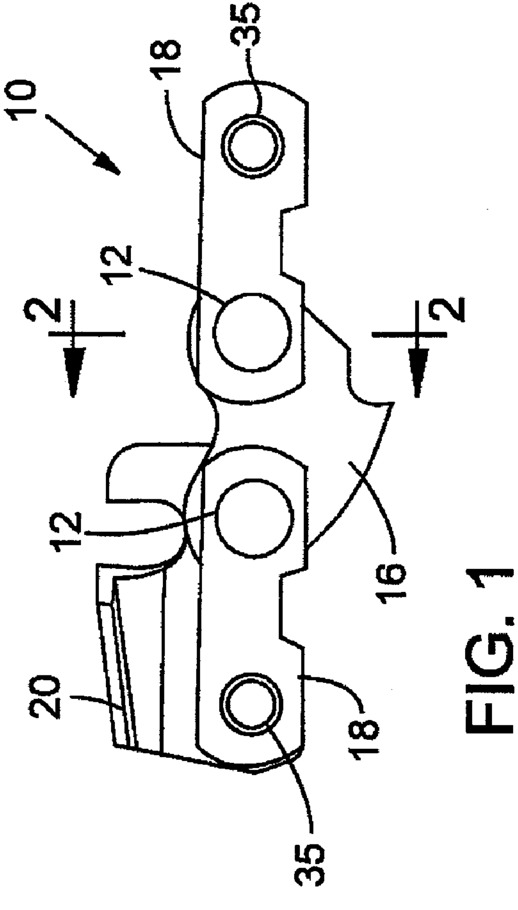
FIG. 1 illustrates a side view portion of a saw chain in accordance with an embodiment of the present invention.

FIG. 1 is a side view of a portion of a chain illustrating how rivets 12 may be used to join components of a chain, such as a saw chain 10. FIGS. 2*a* and 2*b* are cross-sectional views taken at the line 2-2 in FIG. 1. FIG. 2*a* illustrates components joined together prior to forming a rivet head, and FIG. 2*b* illustrates a rivet head 14 having been formed by, for example, deforming the rivet 12 in order to fasten the components together. The components may include a drive link 16, one or more tie straps 18, and a cutter link 20. In the embodiment illustrated, the drive link 16 may exert a force on the rivet 12 in one direction while the tie straps 18 may exert a force on the rivet in another direction imparting shear stress on the rivet 12.

Figure 3:
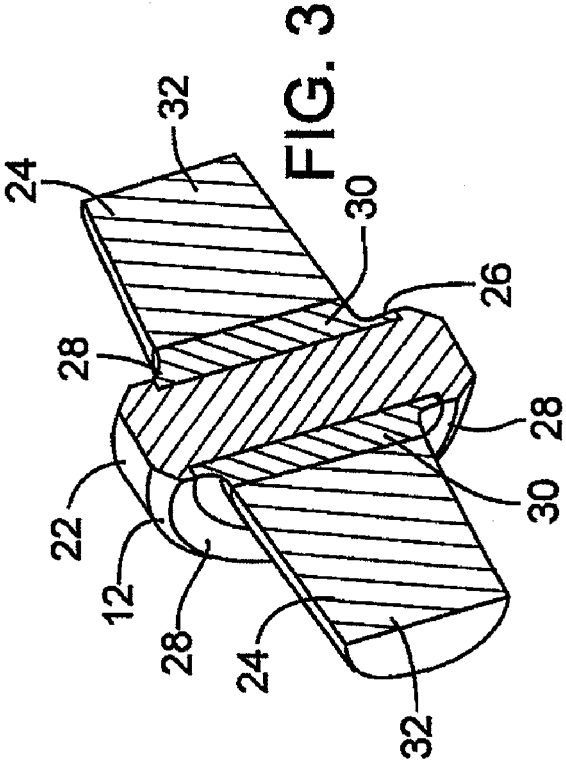
FIG. 3 illustrates a rivet generally cut in half for illustration, in accordance with an embodiment of the present invention.

FIG. 3 is a perspective view of the rivet 12 shown generally cut in half, illustrating one embodiment according to the invention. The rivet 12 may include a flange 22 and two hubs 24 configured to extend from sides 26 of the flange 22. Shoulders 28 may be defined by a junction between the flange 22 and the hubs 24. A shear resistant region 30 may be configured in and around the shoulders 28 that may be optimized to resist shear forces that may be encountered by the saw chain 10 during a cutting operation. The rivet 12 may therefore enable the saw chain 10 to withstand greater stress and be less likely to break. The shear resistant region 30 may be, for example, heat-treated to a greater hardness than the hubs 24 in order to better withstand shear stress. The region on the rivet 12 with a hardness optimized for resistance to shearing may be located within the flange 22 and may extend across the shoulders 28 and into the hubs 24 where shear stress may be present from tension in the chain and/or impact to the cutters. The region optimized for resistance to shearing may be limited in extension into the hub 24 so that it may not inhibit the proper forming of a rivet head 14. The hubs 24 may have strength and properties optimized for rivet formation as illustrated by deformable region 32. Deformable region 32 may be sufficiently deformable to form a rivet head 14 as illustrated in FIG. 2*b*, and may be sufficiently soft to avoid placing demands on rivet forming tools and/or equipment outside a predetermined range, and/or to prolong the life of the rivet forming tools and equipment.

Figure 4:
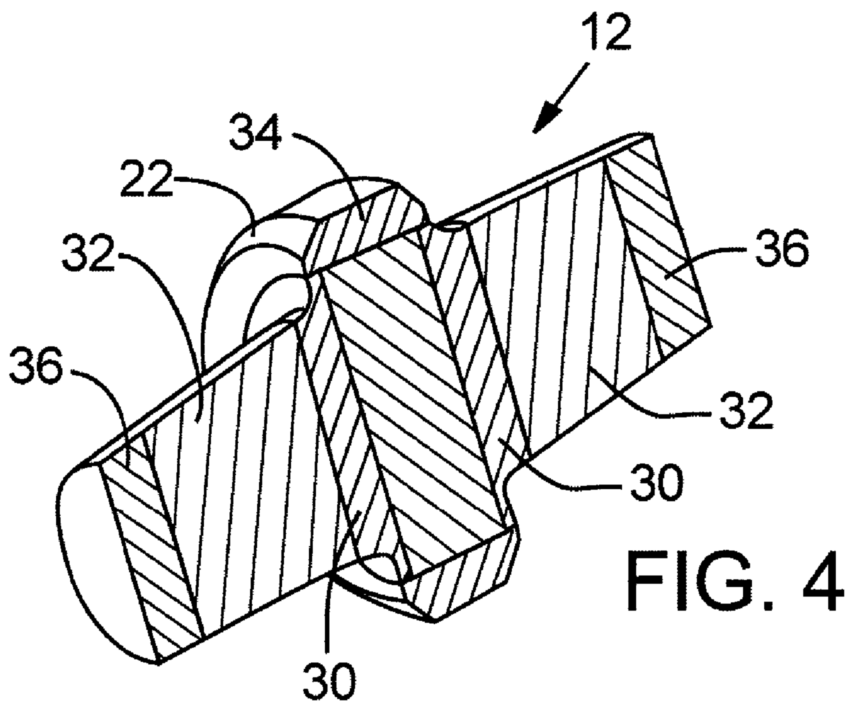
FIG. 4 illustrates a rivet generally cut in half for illustration, in accordance with an embodiment of the present invention.

FIG. 4 is a perspective view of the rivet 12 shown generally cut in half, illustrating one embodiment according to the invention. The rivet 12 may include: a first region or shear resistant region 30 configured to withstand shear stress; a second region 32 may be optimized for rivet formation and configured to deform during, for example, a rivet forming operation; a third region 34, on a circumferential surface of the flange 22 may be configured to resist wear, which may be accomplished, for example, by providing a hardness optimized to resist sliding wear; and a fourth region 36, on the ends of the hubs, may be configured to assist in the rivet forming operation. For example, the fourth region 36 may be slightly harder than the second region 32 such that it may still deform during the formation process, but be more resistive to fracture or further deformation during operation. Rivet heads 14 such as those illustrated in FIG. 2*b* may be formed, for example, by a spinning operation, wherein the fourth region 36 is compressed toward the flange 22 thereby shaping rivet head 14 and deforming the deformable region 32.

Figure 5:
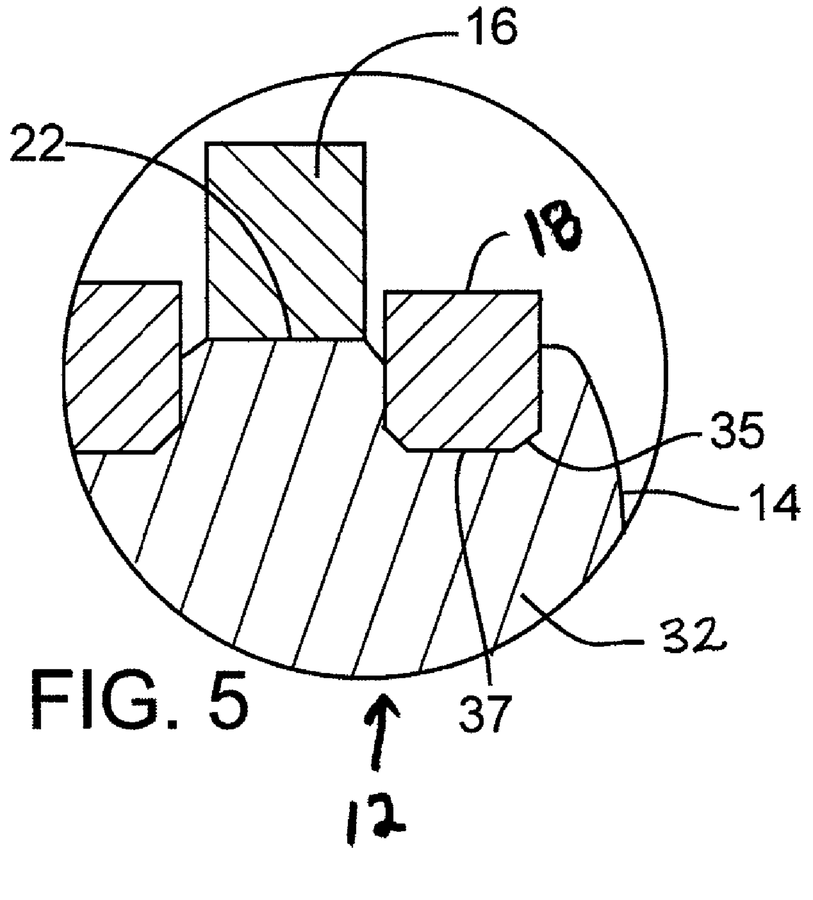
FIG. 5 illustrates a detail view of a portion of FIG. 2*b* in accordance with an embodiment of the present invention.

FIG. 5 is a partial magnified view of portions of FIG. 2*b* illustrating a junction 35 defined between the deformed rivet 12 and the tie straps 18. In this embodiment according to the invention, the second, or deformable, region 32 is sufficiently deformable so that the junction 35 defines a minimal gap between the tie strap 18 and the rivet 12. In one embodiment, the rivet 12 may be held fixed relative the tie straps 18 due to the sufficient deformation of the deformable region 32.

In various embodiments, for example, as illustrated in FIG. 4, each of the aforementioned regions 30, 32, 34, and 36 may have characteristics that are different from one another. One embodiment, according to the invention may provide a rivet 12 having a first or shear resistant region 30 hardened to a shear resistant hardness which may have a value approximately between HRC 38 and HRC 58. In one embodiment, the shear resistant region 30 may be hardened to within a range approximately between HRC 48 and HRC 55. In another embodiment, a second or deformable region 32 may have a deformable hardness that has a value approximately between HRC 25 and HRC 35. In another embodiment, a third or wear resistant region 34 may be hardened to a wear resistant hardness that has a value substantially equal to or greater than HRC 58. And in another embodiment, one embodiment may provide a fourth region 36 hardened to a value approximately between HRC 30 and HRC 35.

Various embodiments may include a rivet configured differently. For example, a rivet may have one hub joined to a flange at a shoulder. The shoulder region may have properties optimized to resist shear stresses. The depth of penetration of the hardness level of the shoulder/shear resistant region may vary depending on the nature and magnitude of the potential encountered forces. Likewise, the depth of the hardness of the wear resistant surface may also vary depending on such factors. Further, the rivet may have one or more additional regions having a different hardness, similar to the regions described above.

Figure 6B:
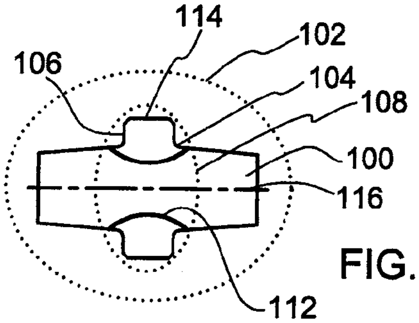
FIGS. 6*b* and 6*c* are side views of rivets illustrating regions wherein described operations of the method illustrated in FIG. 6*a* may be conducted.
Figure 6A:
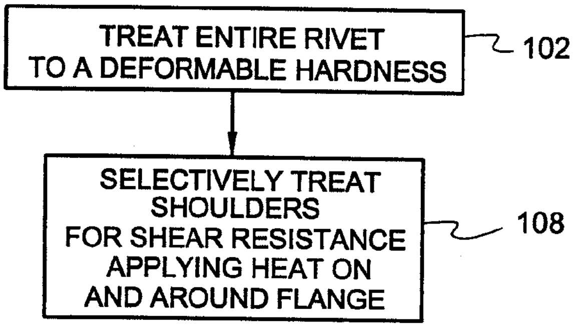
FIG. 6*a* is a flow diagram illustrating a method in accordance with various embodiments of the invention.
Figure 6C:
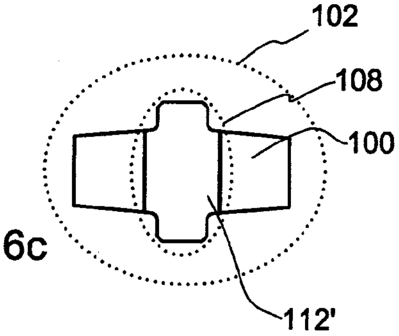

FIG. 6*a* is a flow diagram illustrating a method in accordance with various embodiments of the invention and FIGS. 6*b* and 6*c* are side views of rivets 100 illustrating regions of each rivet 100 wherein described operations of the method illustrated in FIG. 6*a* may be conducted. Dotted line ellipses may illustrate a correspondence between the operations and regions of the rivet 100. The method may include:

Heat-treating an entire rivet 100 to a first hardness, for example, a deformable hardness, 102. The deformable hardness may be, for example, a value roughly between HRC 25 and HRC 35; and Selectively heat-treating the shoulder region 104 to a shear resistant hardness by applying heat on and around a flange 106 of the rivet 100, 108. The shear resistant hardness may be, for example, a value roughly between HRC 38 and HRC 58. In one embodiment, the shear resistant hardness may be a range approximately between HRC 48 and HRC 55. Selective heat-treating may be performed, for example, by induction heat treatment, or other hardness increasing method. In one embodiment, the treated region 112 may be allowed to extend partially from a flange circumference 114 toward a center 116 of the rivet 100 as illustrated in FIG. 6*b*. In one embodiment, the treated region 112' may be allowed to extend across the rivet, as illustrated in FIG. 6*c*.

Figure 7B:
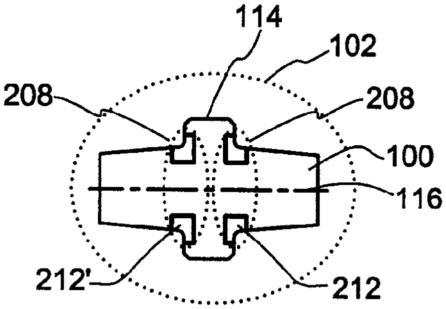
FIGS. 7*b* and 7*c* are side views of rivets illustrating regions wherein described operations of the method illustrated in FIG. 7*a* may be conducted.
Figure 7A:
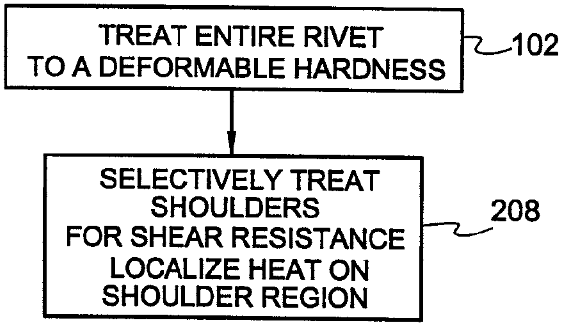
FIG. 7*a* is a flow diagram illustrating a method in accordance with various embodiments of the invention.
Figure 7C:
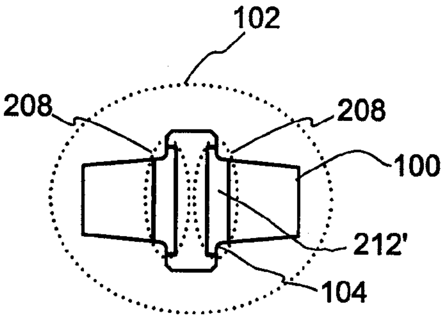

FIG. 7*a* is a flow diagram illustrating a method in accordance with various embodiments of the invention and FIGS. 7*b* and 7*c* are side views of rivets 100 illustrating regions of the rivet 100 wherein described operations of the method illustrated in FIG. 6*a* may be conducted in the various embodiments. The method may include operations similar to the embodiment shown in FIG. 6*a*. However, the rivet 100 may be selectively treated to a shear resistant hardness by applying localized heat on the shoulder regions 104, as illustrated by operation 208. In one embodiment, the treated region 212 may be allowed to extend partially from a flange circumference 114 toward a center 116 of the rivet 100 as illustrated in FIG. 7*b*. In one embodiment the treated region 212' may be allowed to extend across the rivet, as illustrated in FIG. 7*c*.

Figure 8B:
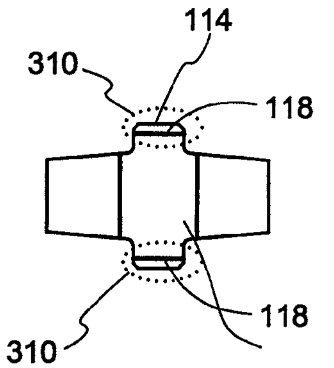
FIG. 8*b* is a side view of a rivet illustrating regions wherein described operations of the method illustrated in FIG. 8*a* may be conducted.
Figure 8A:
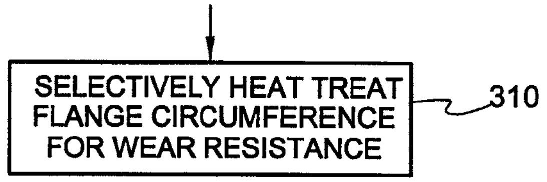
FIG. 8*a* is a flow diagram illustrating a method in accordance with various embodiments of the invention.

FIGS. 8*a* and 8*b* illustrate another embodiment according to the invention wherein a further treatment operation 310 may be performed on the flange circumference 114, in addition to the operations performed in the embodiments illustrated in FIG. 6*a*. For example, the flange circumference 114 may be selectively treated to a wear resistant hardness, 118. The wear resistant hardness may be, for example, a value substantially equal to or greater than HRC 58. In another embodiment, the further treatment operation 310 could be performed in addition to those performed in the embodiments illustrated in 7*a*

Figure 9B:
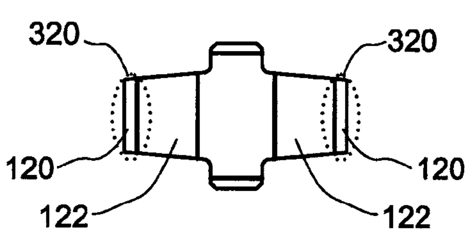
FIG. 9*b* is a side view of a rivet illustrating regions wherein described operations of the method illustrated in FIG. 9*a* may be conducted.
Figure 9A:
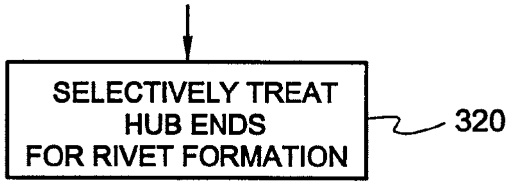
FIG. 9*a* is a flow diagram illustrating a method in accordance with various embodiments of the invention.

FIGS. 9*a* and 9*b* illustrate another embodiment according to the invention wherein a further treatment operation 320 may be performed on ends 120 of the hubs 122, in addition to one or more of the operations performed in the embodiments illustrated in FIGS. 6*a* and 8*a*. For example, the ends 120 may be treated to a rivet formation assistance hardness such that a compression, crushing, spinning, or other rivet head forming operation may be more effectively performed on the ends 120 to deform the hubs 122. In another embodiment, the further treatment operation 320 could be performed in addition to those performed in the embodiments illustrated in 7*a*.

Figure 10B:
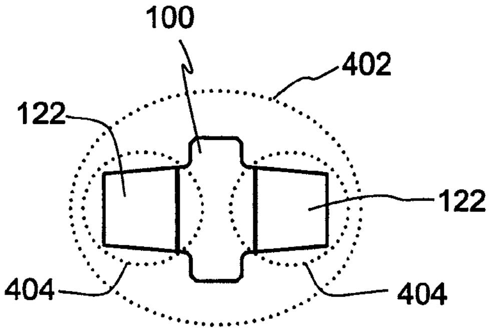
FIG. 10*b* is a side view of a rivet illustrating regions wherein described operations of the method illustrated in FIG. 10*a* may be conducted.
Figure 10A:
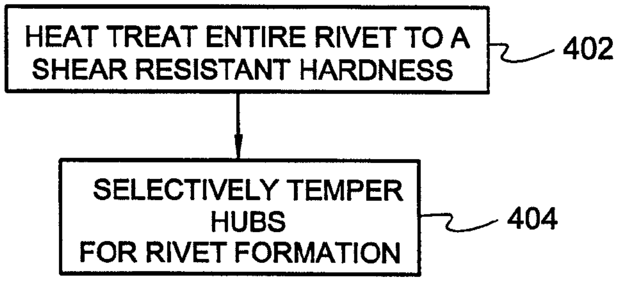
FIG. 10*a* is a flow diagram illustrating a method in accordance with various embodiments of the invention.

FIG. 10*a* is a flow diagram illustrating a method in accordance with an embodiment of the invention, and FIG. 10*b* is a side view of a rivet 100 illustrating regions of the rivet 100 wherein described operations of the method illustrated in FIG. 10*a* may be conducted. The method may include:

Heat-treating an entire rivet 100 to a first hardness, for example, a shear resistant hardness, 402. The shear resistant hardness may be, for example, a value roughly between HRC 38 and HRC 58. In one embodiment, the shear resistant hardness may be between HRC 48 and HRC 55; and Tempering the hubs 122 to a deformable hardness, 404. The deformable hardness may be a value roughly between HRC 25 and HRC 35.

In one embodiment, a further operation the same or similar to that illustrated in FIG. 8*a* may be performed wherein the flange circumference 114 is selectively heat-treated to a wear resistant hardness, 310. The wear resistant hardness may be, for example, a value substantially equal to or greater than HRC 58. In one embodiment, a further operation the same or similar to that illustrated in FIG. 9*a* may be performed wherein the ends 120 of hubs 122 may be further hardened above the hardness of the hubs 122 to facilitate reliable head formation.

Figure 11B:
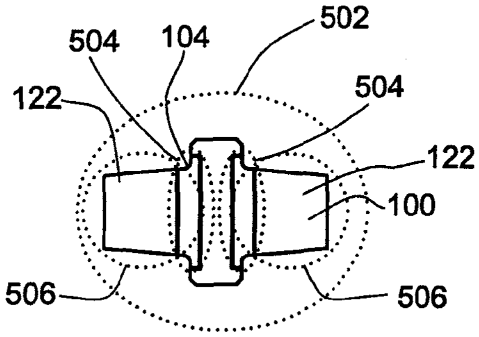
FIG. 11*b* is a side view of a rivet illustrating regions wherein described operations of the method illustrated in FIG. 11*a* may be conducted.
Figure 11A:
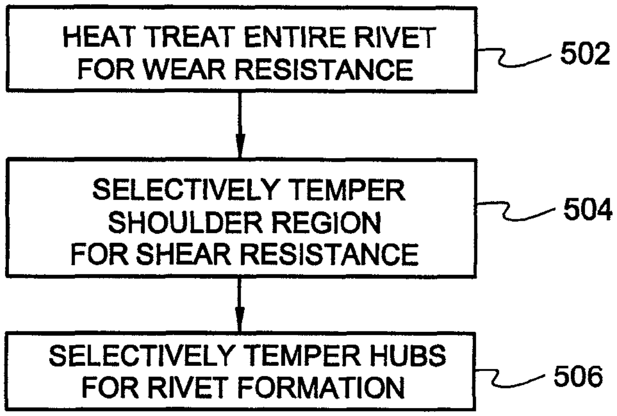
FIG. 11*a* is a flow diagram illustrating a method in accordance with various embodiments of the invention.

FIG. 11*a* is a flow diagram illustrating a method in accordance with various embodiments of the invention, and FIG. 11*b* is a side view of a rivet 100 illustrating regions of the rivet 100 wherein described operations of the method illustrated in FIG. 11*a* may be conducted. The method may include:

Heat-treating an entire rivet 100 to a first hardness, for example, a wear resistant hardness, 502. The wear resistant hardness may be, for example, a value substantially equal to or greater than HRC 58;

Selectively tempering at least the shoulder region 104 to a shear resistant hardness, 504. The shear resistant hardness may be, for example, a value roughly between HRC 38 and HRC 58. In one embodiment, the shear resistant hardness may be between HRC 48 and HRC 55; and Tempering the hubs 122 to a deformable hardness, 506. The deformable hardness may be a value roughly between HRC 25 and HRC 35.

In one embodiment, a further operation the same or similar to that illustrated in FIG. 9*a* may be performed wherein the hub ends are treated to a rivet head forming hardness.

Figure 12B:
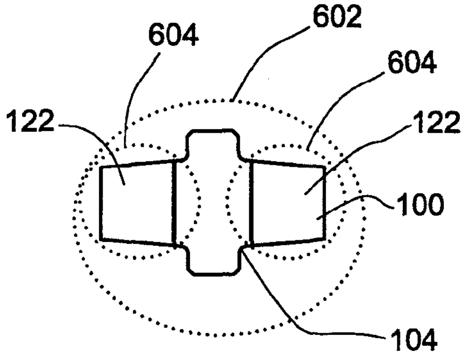
FIG. 12*b* is a side view of a rivet illustrating regions wherein described operations of the method illustrated in FIG. 12*a* may be conducted.
Figure 12A:
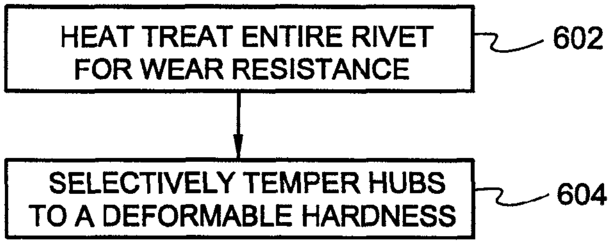
FIG. 12*a* is a flow diagram illustrating a method in accordance with various embodiments of the invention.

FIG. 12*a* is a flow diagram illustrating a method in accordance with an embodiment of the invention, and FIG. 12*b* is a side view of a rivet 100 illustrating regions of the rivet 100 wherein described operations of the method illustrated in FIG. 12*a* may be conducted. The method may include:

Heat-treating an entire rivet 100 for wear resistance, 602. For example a hardness value substantially equal to or greater than HRC 58; and selectively tempering hubs 122 of the rivet 100 to a deformable hardness, 604. The method may be appropriate when using a material which is not too brittle at elevated hardness levels.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. A rivet for securing side links to center links of a cutting chain comprising:

a flange portion having a circumferential surface positioned to engage a rivet hole of a center link, the circumferential surface having a first hardness;

opposing hub portions extending from opposing sides of the flange for engaging rivet holes of side links, the opposing hub portions having a second hardness configured to deform during a rivet forming operation and an end that is hardened to a third hardness greater than the second hardness; and opposing shoulder portions, each defined by a junction between the flange and a respective hub and that extends at least partially into the flange portion and the hub portion, wherein the shoulder portions have a fourth hardness that is less than the first hardness and greater than the second hardness.

2. The rivet of claim 1 wherein the first hardness is greater than or equal to about HRC 58, the second hardness is between about HRC 25 and HRC 35, the third hardness is between HRC 30 and HRC 35, and the fourth hardness is between HRC 38 and HRC 58.

3. A cutting chain, comprising:

a center link having a center link rivet holes;

a side link pair adapted to couple to the center link on opposing sides of the center link, each side link of the side link pair having a side link rivet hole;

a rivet disposed in the center link rivet hole and the side link rivet holes, wherein the rivet has opposing ends that are enlarged to couple the side link pair to the center link, the rivet further having a center flange portion disposed between two hub portions, the center flange portion having a circumferential surface having a first hardness and positioned to rotatably engage center link rivet hole, the two hub portions extending from opposing sides of the flange and having a diameter less than or equal to a diameter of the side link rivet holes, the hub portions having a second hardness configured to deform and an end that is hardned to a third hardness greater than the second hardness, and shoulder portions defined by a junction between the flange and respective hub portions that extends at least partially into the center flange portion and the hub portion, wherein the shoulder portions are treated to a fourth hardness that is less than the first hardness and greater than the second hardness.

4. The cutting chain of claim 3, wherein the first hardness is greater than or equal to about HRC 58, the second hardness is between about HRC 25 and HRC 35, the third hardness is between HRC 30 and HRC 35, and the fourth hardness is between HRC 38 and HRC 58.

* * * * *